United States Patent [19]

Kraner

[11] Patent Number: 5,104,686
[45] Date of Patent: Apr. 14, 1992

[54] CRT FUNNEL COATING APPARATUS AND METHOD

[75] Inventor: James L. Kraner, Barrington, Ill.

[73] Assignee: Zenith Electronics Corporation, Glenview, Ill.

[21] Appl. No.: 596,815

[22] Filed: Oct. 12, 1990

[51] Int. Cl.$^5$ .......................... B05D 5/12; B05B 13/06
[52] U.S. Cl. .......................................... 427/68; 427/72; 427/231; 427/232; 427/233; 427/240; 427/425; 118/317; 118/318; 118/321
[58] Field of Search ................... 427/69, 72, 231, 232, 427/233, 425, 240; 118/317, 318, 321

[56] References Cited

U.S. PATENT DOCUMENTS

| | | | |
|---|---|---|---|
| 2,619,430 | 11/1952 | Fink | 118/318 |
| 2,763,564 | 9/1956 | McKenzie et al. | 118/318 |
| 3,791,846 | 2/1974 | Nuehring | 427/68 |
| 4,125,088 | 11/1978 | Hong et al. | 118/318 |

Primary Examiner—Janyce Bell

[57] ABSTRACT

Apparatus for applying a conductive coating of DAG material to the inner surface of a cathode ray tube (CRT) funnel includes a stationary DAG spray gun and a movable DAG rotating slinger. The CRT funnel is rotated to allow the stationary spray gun to deposit a first DAG coating on an intermediate flared portion of the inner surface of the funnel, including the location of its anode button. The DAG slinger, which includes a rotating disc for radially discharging the DAG, is then displaced through the neck portion of the CRT funnel toward the open, enlarged end of the funnel to deposit a second DAG coating which overlaps the first DAG coating. The apparatus includes a variable DAG flow control arrangement for depositing a DAG coating of uniform thickness over the inner surface of the CRT funnel, as well as a DAG cleaning and recovery arrangement for preventing DAG not deposited on the CRT funnel from escaping to the environment and for recovering this DAG for re-use.

18 Claims, 7 Drawing Sheets

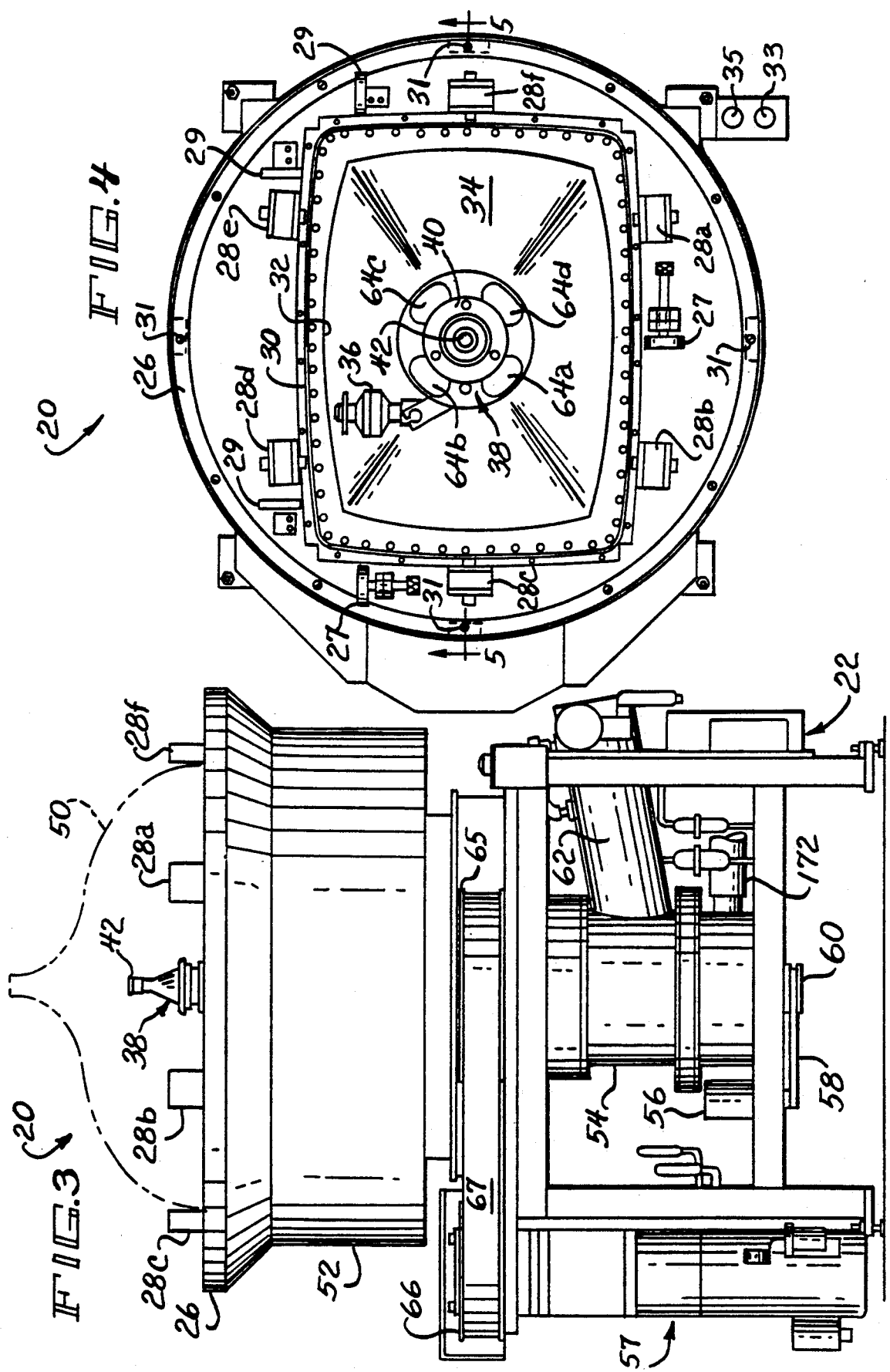

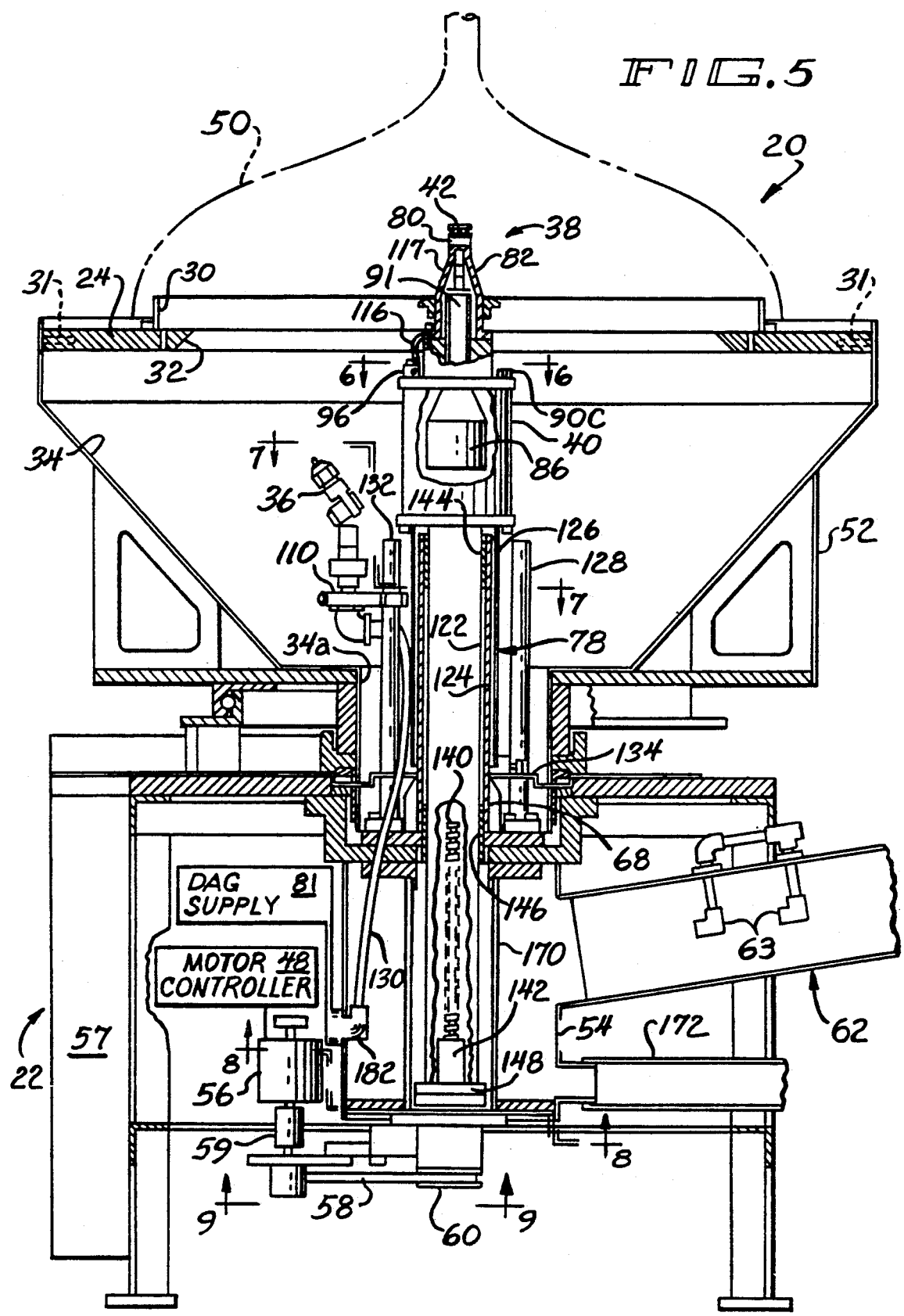

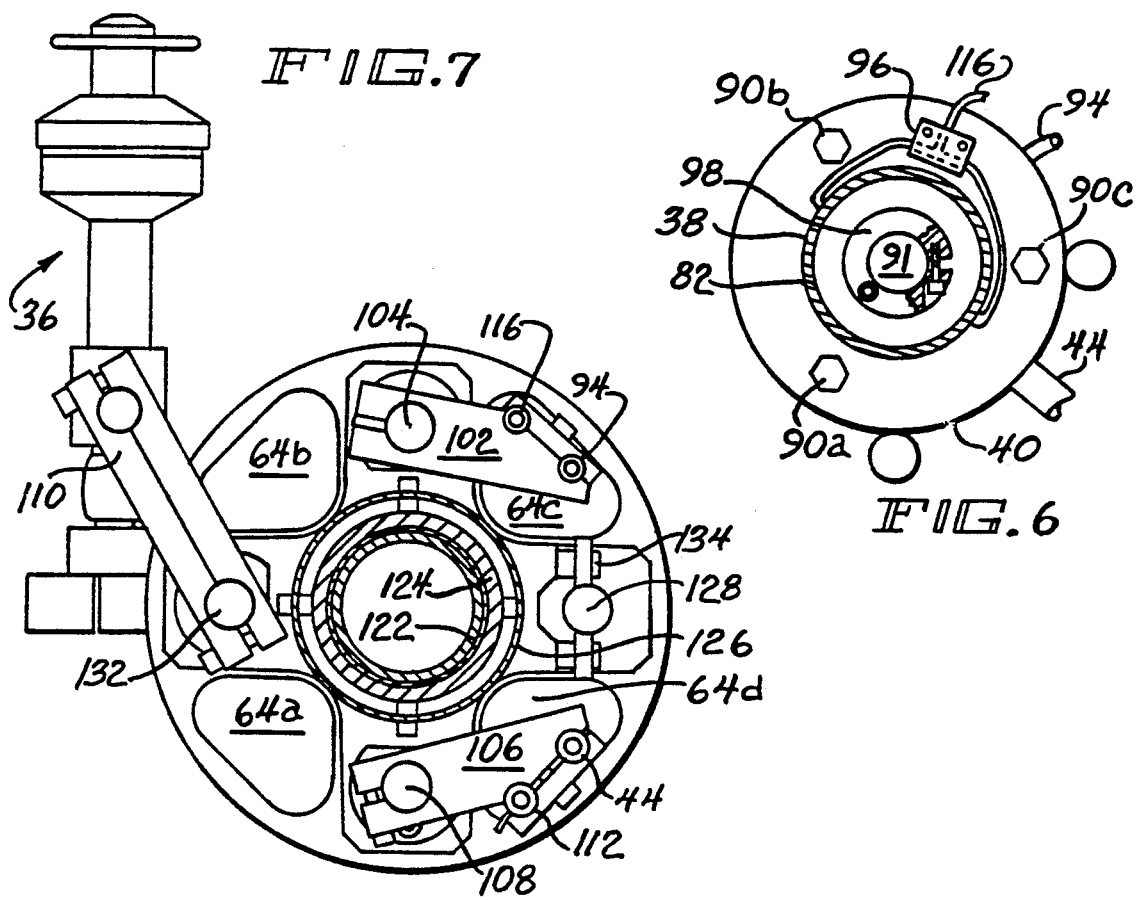
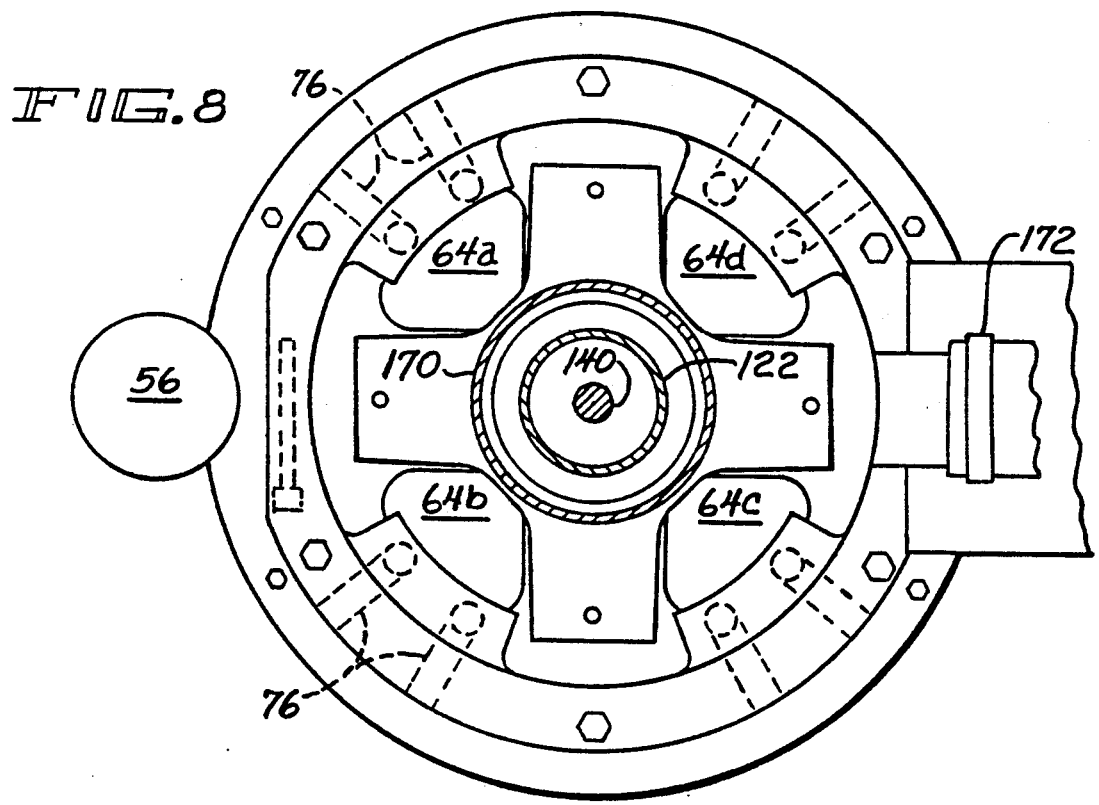

CRT FUNNEL COATING APPARATUS AND METHOD

BACKGROUND OF THE INVENTION

This invention relates generally to cathode ray tubes (CRTs) and is particularly directed to the deposit of a conductive coating of DAG on the inner surface of a CRT funnel.

A conventional color CRT consists of an evacuated envelope having a neck portion, a faceplate, and a funnel portion therebetween. An electron gun is disposed in the neck portion of the envelope, with a tri-color emitting phosphor screen disposed on the inner surface of the faceplate. A shadow mask is located between the electron gun and the screen, in spaced relation from the screen. The electron gun includes a plurality of electrodes for focusing and accelerating three electron beams toward the phosphor screen. The electrodes are maintained in position within the envelope by support means. Typically, several high voltage and low voltage electrodes are attached to the support means along the electron beam paths to facilitate focusing and accelerating of the electron beams. The high voltage electrodes typically operate at an ultor potential of about 30 kilovolts, with the low voltage electrodes typically operating at approximately 8-10 kilovolts, or less.

A conductive coating comprised of a material referred to as "DAG" having a resistance on the order of 100 ohms is disposed on the inner surface of the funnel and neck portions of the envelope. The interior conductive coating operates at ultor potential, with spacers mounted on the electron gun electrode nearest the phosphor screen contacting the interior conductive coating to provide ultor potential to the electron gun. An exterior conductive coating, electrically isolated from the interior conductive coating, is provided on the outside of the funnel to facilitate grounding of the CRT envelope. The interior and exterior DAG coatings on the funnel serve as a large capacitor which filters the high-voltage.

Current practice calls for applying the inner DAG coating manually by inserting a paint brush in the CRT neck and moving it outward toward the flared portion of the CRT funnel as it is rotated. The CRT funnel is then placed on a rotating drum for an application of a DAG coating on its flared portion by means of a stationary airless spray gun as the drum is rotated. This approach is labor intensive and thus expensive; is not conducive to applying a DAG coating of uniform thickness having predictable electrical characteristics; and results in excess DAG not deposited on the CRT funnel which is difficult to remove from, and causes clogging of, the funnel coating apparatus.

The present invention addresses the aforementioned limitations of the prior art by providing for the high speed, automatic spraying of the interior of a CRT funnel with a DAG coating in a precise, high speed, and efficient manner.

OBJECTS OF THE INVENTION

Accordingly, it is an object of the present invention to expedite and reduce the costs of CRT funnel processing during CRT manufacture.

It is another object of the present invention to provide an automated, high speed, and precise apparatus and method for coating the inner surface of a CRT funnel with a conductive layer of DAG.

A further object of the present invention is t reduce waste as well as environmental hazards involved in coating the inner surface of a CRT funnel with a conductive DAG layer.

Yet another object of the present invention is to apply a conductive DAG coating of uniform thickness on the inner neck and flared portions of a CRT funnel.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 3 is a side elevation view of the CRT funnel internal coating apparatus of FIG. 1;

FIG. 4 is a top plan view of the CRT funnel internal coating apparatus of FIG. 1;

FIG. 5 is a vertical sectional view shown partially cutaway of the CRT funnel internal coating apparatus illustrated in FIG. 4 taken along site line 5—5 therein;

FIG. 6 is a sectional view of the CRT funnel internal coating apparatus shown in FIG. 5 taken along site line 6—6 therein;

FIG. 7 is a sectional view of the CRT funnel internal coating apparatus shown in FIG. 5 taken along site line 7—7 therein;

FIG. 8 is a sectional view of the CRT funnel internal coating apparatus shown in FIG. 6 taken along site line 8—8 therein;

DESCRIPTION OF THE PREFERRED EMBODIMENT

Figure 1:
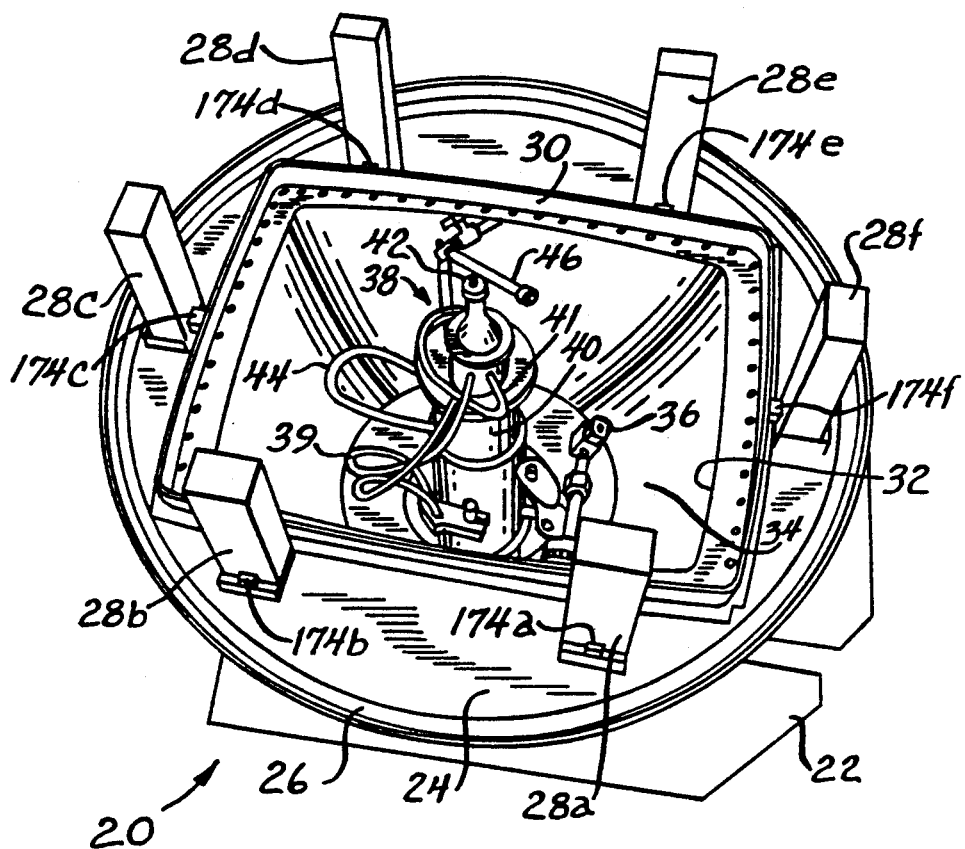
FIG. 1 is an upper perspective view of a CRT funnel internal coating apparatus in accordance with the present invention.

Referring to FIG. 1, there is shown an upper perspective view of a CRT funnel internal coating apparatus 20 in accordance with the principles of the present invention. With reference also t the various views of the CRT funnel internal coating apparatus 20 shown in FIGS. 3-9, the configuration and operation of the apparatus will now be described in detail.

The CRT funnel internal coating apparatus 20 includes a generally circular platform, or tabletop, 24 disposed on a support structure 22. The platform 24 includes a generally rectangular aperture 32 disposed therein, about which is positioned a funnel spray mask 30. Extending downward from the platform 24 about aperture 32 is a tapered drum 34. Disposed on the upper surface of the platform 24 about aperture 32 in a spaced manner are a plurality of CRT funnel guides 28a–28f and CRT funnel stops 174a–174f. The CRT funnel guides 28a–28f assist loading of the funnel, while stops 174a–174f ensure proper planar positioning of a CRT funnel (not shown in FIG. 1 for simplicity) on the upper surface of the platform 24 about aperture 32. Final funnel positioning is facilitated by funnel locators 29 shown in FIG. 4. Disposed within the tapered drum 34 and extending upward from a lower portion thereof is an air turbine DAG slinger 38 which includes an air turbine housing 40 and a rotatable DAG slinger disc 42 on the upper end thereof. Coupled to the air turbine housing 40 is an air hose 44, while coupled to the DAG slinger 38 are a DAG supply line 39 and an air supply line 41. The air hose 44 provides air under pressure for operating an air turbine in rotationally displacing the slinger disc 42, while air line 41 provides air to the rotating disc assembly for bringing the disc to a stop as described in detail below.

Also disposed within the tapered drum 34 and positioned so as to spray DAG on an inner surface of a CRT funnel disposed over the aperture 32 in the platform 24 is a stationary airless spray gun 36 for spraying DAG on an inner body portion of a CRT funnel. In addition, a water spray nozzle 46 is positioned within the tapered drum 34 for spraying a water stream on the inner surface of the drum in rinsing away DAG particles which are not deposited on the inner surface of a CRT funnel. The rinse water directed onto the inner surface of the tapered drum 34 by spray nozzle 46 flows to a lower portion of the drum for removing unused DAG via a water/air discharge arrangement described below. Disposed about the generally circular platform 24 is a platform gasket 26.

Figure 11:
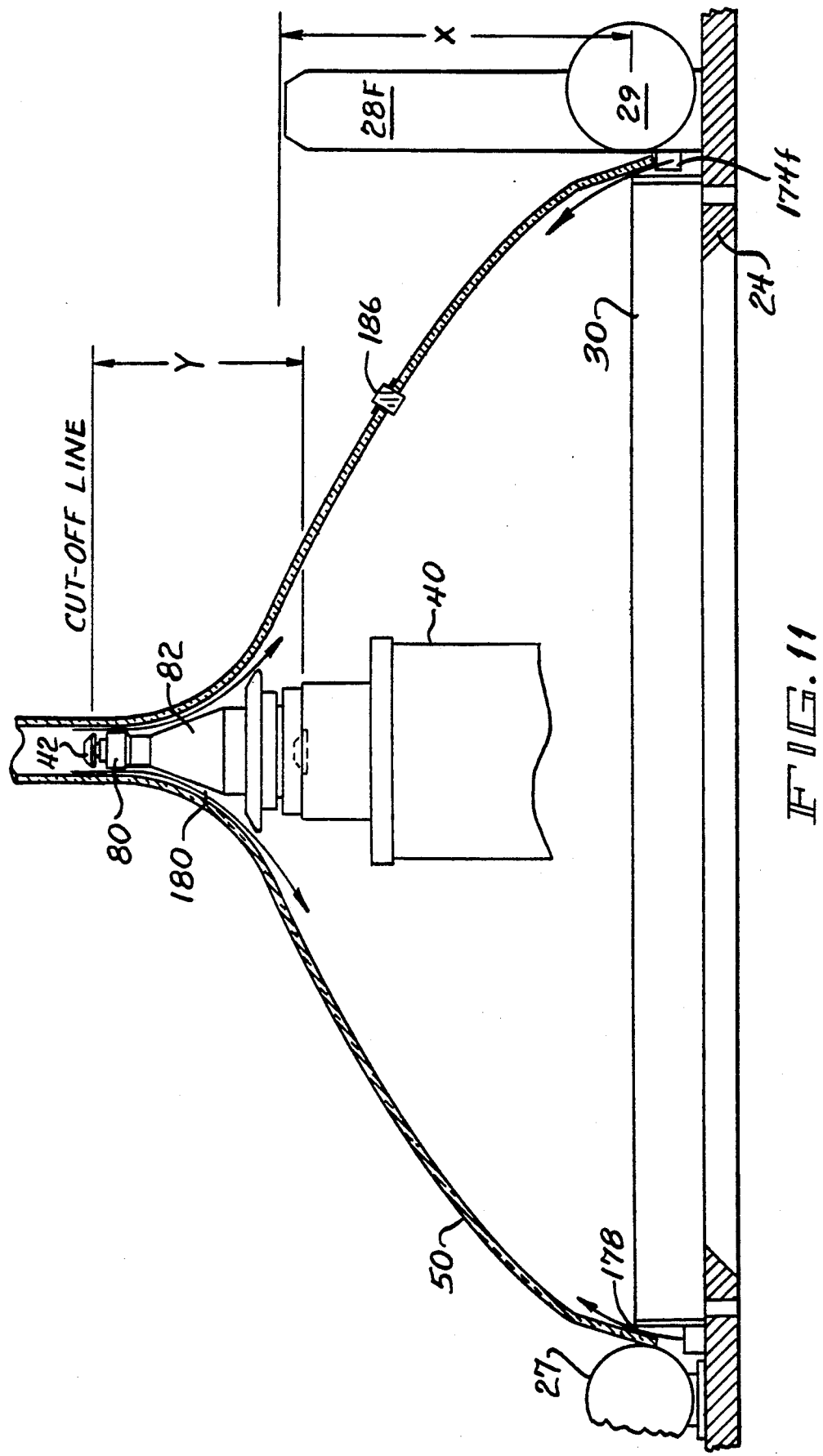
FIG. 11 is a partial sectional view of an upper portion of the CRT funnel internal coating apparatus showing the DAG slinger disc positioned within the neck portion of a CRT funnel for coating in accordance with the present invention.

As shown in the top plan view of FIG. 4, also disposed on the upper surface of the platform 24 about aperture 32 are a plurality of X-Y locators 29 in the form of fixed rollers for proper positioning of the CRT funnel 50 relative to the slinger assembly 38. In addition, spring loaded rollers 27 are positioned on the upper surface of the platform 24 to ensure the CRT funnel is held against the X-Y locators 29 for proper positioning of the CRT funnel. Referring to FIG. 11, it can be seen that the spring loaded roller 27 positions the CRT funnel 50 adjacent to an outer portion of the spray mask 30 while urging the CRT funnel against an oppositely positioned CRT funnel locator 29 which, in a preferred embodiment, is a fixed roller. A portion of the CRT funnel 50 is positioned upon and supported by the CRT stop 174f. The spring loaded rollers 27 also facilitates removal of a CRT funnel 50 from the platform 24 following the coating of its inner surface with a conductive DAG layer as described below. Also positioned on an upper surface of the platform 24 adjacent the periphery thereof are a plurality of platform centering screws 31 shown in FIG. 4. The four platform centering screws 31 allow for aligning the center of the platform 24 with the vertical axis of the air turbine slinger assembly 38 extending upward from a center, lower portion of the tapered drum 34. Proper positioning of the platform 24 as well as a CRT funnel disposed thereon relative to the DAG slinger disc 42 is necessary for the deposit of a DAG coating of the desired uniform thickness and over a designated inner surface area of the CRT funnel.

With specific reference to the side elevation view of FIG. 3 and the partially cut-away vertical sectional view of FIG. 5, additional details of the CRT funnel internal coating apparatus 20 will now be described. As shown in these figures, and as previously described, a CRT funnel 50 shown in dotted line form is adapted for positioning over and about the aperture 32 in the platform 24. Attached to the support structure 22 is a servo motor and gear reducer combination 57 which is coupled to a drive pulley 66. Drive pulley 66 is, in turn, coupled by means of the combination of a drum drive belt 67 and a drum pulley 65 to a drum guard 52. The drum guard 52 is coupled to and disposed about the tapered drum 34. Actuation of the servo motor and gear reducer 57 causes rotation of drive pulley 66, drive belt 67 and drum pulley 65 resulting in rotational displacement of the drum guard 52, drum 34 and platform 24. Rotational displacement of the platform 24 causes a corresponding rotation of a CRT funnel 50 disposed thereon during the DAG coating method as described below.

As shown in detail in FIG. 5, the air turbine housing 40 is positioned upon and supported by a displacement and support mechanism 78. The displacement and support mechanism 78 includes an outer cylindrical splash guard 126, an intermediate bearing support 124, an inner sliding tube 122, a ball screw arrangement for converting rotational displacement to linear displacement, and a lower sprayer inner housing 170. The cylindrical bearing support 124 is concentrically disposed within the splash guard 126. Similarly, the sliding tube 122 is concentrically disposed within the bearing support 124. Disposed between the sliding tube 122 and bearing support 124 are upper and lower guide bearings 144 and 146 which facilitate linear displacement between the slide tube and bearing support. A lower end of the sliding tube 122 is positioned upon and coupled to a disc-shaped sliding tube mount 148 disposed within the lower sprayer inner housing 170. Mounted to a center, upper portion of the sliding tube mount 148 is a ball screw nut 142. Inserted through and threadably engaging the ball screw nut 142 is an elongated ball screw 140 which is positioned within the cylindrical space defined by the sliding tube 122. A lower end of the ball screw 140 is coupled to a drive pulley 60 which, in turn, is coupled by means of a drive belt 58 to the combination of a stepping motor shaft 152 and pulley 154 as shown in the partially cut-away portion of FIG. 9. Shaft 152 is coupled by means of coupling 59 to a stepper motor 56. The stepper motor 156 rotationally displaces pulley 154 which, in turn, drives belt 58 and rotationally displaces the combination of drive pulley 60 and threaded ball screw 140. Rotational displacement of ball screw 140 causes the vertical displacement of the combination of ball screw nut 142, sliding tube mount 148 and sliding tube 122. With turbine housing 40 positioned upon and supported by the sliding tube 122, vertical displacement of the sliding tube results in a corresponding vertical displacement of the turbine housing 40 and DAG slinger assembly 38. In this manner, the DAG slinger assembly 38 may be vertically displaced upward from a retracted position as shown in FIG. 5 to an extended position wherein the slinger disc 42 is positioned within the neck portion of a CRT funnel 50 as shown in FIG. 11. Opposite rotational displacement of the ball screw 40 lowers the air turbine housing 40 and DAG slinger assembly 38 to the retracted position shown in FIG. 5. A controller 48 is coupled to the stepping motor 56 for controlling its operation in a timed manner as described below. The controller 48 may be conventional in design and operation and may include a computer or digital controller.

Disposed about the lower sprayer inner housing 170 is a lower sprayer outer housing 54. Coupled to and extending from the lower sprayer outer housing 54 is an air water scrubber exhaust tube 62 and a water drain 172. During operation of the CRT funnel internal coating apparatus 20, DAG particles which are not directed onto and adhere to the CRT funnel 50, but rather are deposited upon the drum 34 or other portions of the apparatus are washed down to a lower portion of the drum and into the space intermediate to the lower sprayer inner and outer housings 170 and 54. The water and DAG particles are removed from the lower sprayer outer housing 54 via water drain 72, while air is removed from the lower sprayer outer housing 54 via the water air scrubber exhaust tube 62. Disposed within the exhaust tube 62 are a plurality of water spray nozzles 63 which remove DAG particles from the exhausted air flow and ensure that these DAG particles are removed via the water drain 172. The DAG particles in the drain water may be recovered for subsequent use in the CRT funnel internal coating apparatus. The water air scrubber exhaust tube 62 is coupled to air displacement means such as an exhaust fan (not shown for simplicity) for drawing air from the lower portion of the apparatus housing and forming a draft about the forward edge of the CRT funnel 50 as shown by the direction of the air flow arrows in FIG. 11. Downward air flow within the CRT funnel 50 prevents the DAG material from being exhausted upward through the neck of the CRT funnel and, in conjunction with spray mask 30, this air flow ensures a clean forward edge of the CRT funnel 50.

Also coupled to and inserted through the lower sprayer outer housing 54 is a full circle polar lead 182. The full circle polar lead 182 is coupled to a DAG supply 81 as well as to the stationary, airless spray gun 36 via DAG supply line 130. The stationary, airless spray gun 36 deposits a DAG coating on a lower portion of the inner surface of the CRT funnel 50 designated by the letter "X" as shown in FIG. 11. The stationary, airless spray gun 36 is supported and maintained in position by the combination of a clamp 110 and a support post 132 attached at a lower end thereof to the support structure 22 as shown in FIG. 7. Also attached to the support structure 22 and extending upward therefrom in parallel, closely spaced relation to the sliding tube 122 is a radial guide post 128. The radial guide post 128 is securely attached to the support structure 22 and engages a guide structure 134 attached to the sliding tube 78. The coupling between the radial guide post 128 and guide structure 134 ensures vertical displacement, either upward or downward, of the sliding tube 122 within the tapered drum 34 and prevents rotation of the sliding tube and air turbine housing 40 positioned thereon.

Figure 9:
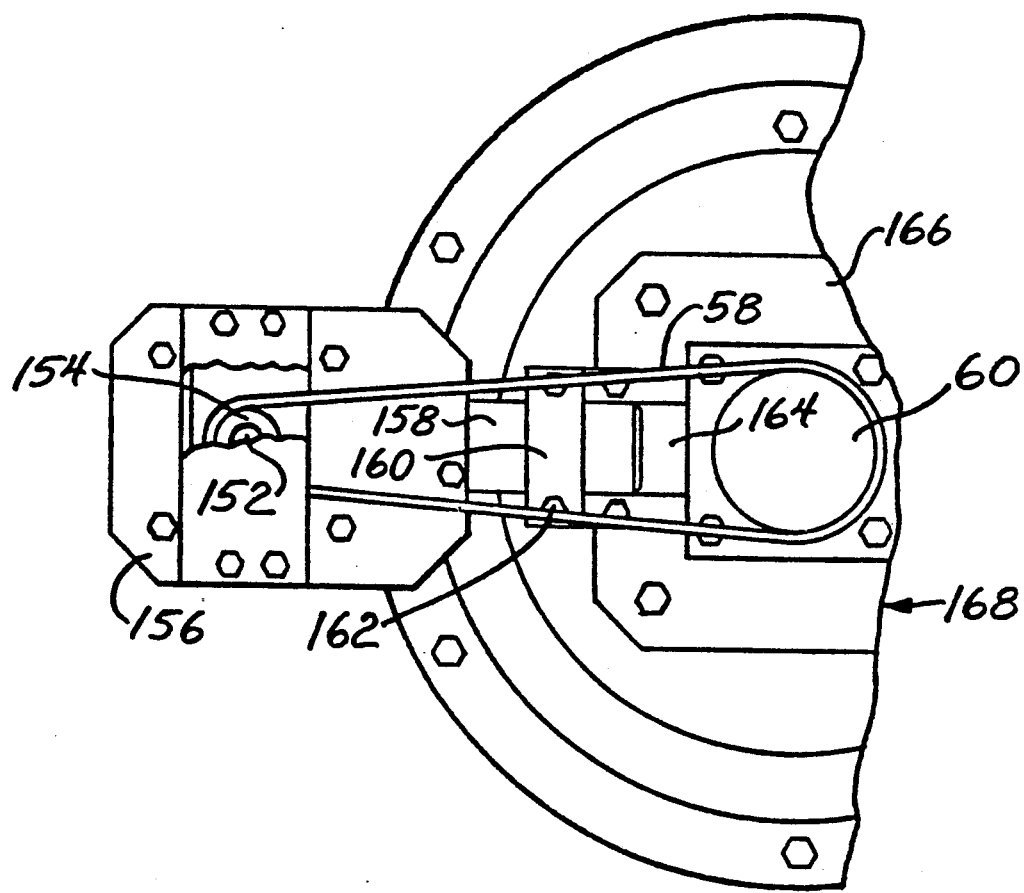
FIG. 9 is a partially cut-away bottom plan view of a portion of the CRT funnel internal coating apparatus shown in FIG. 5 taken along site line 9—9 therein.

Referring again to the partial bottom plan view of FIG. 9, additional details of the drive arrangement for rotating the ball screw in vertically displacing the air turbine slinger assembly (neither of which are shown in FIG. 9 for simplicity) will now be described. Covering a lower end portion of the lower sprayer housing is a sump structure 168. The sump structure 168 includes a lower plate 166 which includes a slide guide 164. One end of a slide bar 158 is inserted in and movable along the slide guide 164. The other end of the slide bar 158 is securely attached to a motor mounting plate, or bracket, 156. The motor mounting plate 156 is securely attached to the stepping motor which vertically displaces the air turbine slinger assembly via the stepping motor shaft 152 and drive pulley 154. A slide clamp 160 in combination with a pair of clamp screws 162 allows the slide bar 158 to be secured in a fixed position within the slide guide 164. By loosening the clamp screws 162 and moving the mounting plate 156 away from the lower plate 166 of the sump structure 168, drive belt 58 may be maintained under tension to provide secure coupling between the stepping motor and ball screw.

DAG particles discharged by the airless, stationary spray gun 36 as well as by the DAG slinger disc 42 which are not deposited on the inner surface of the CRT funnel are washed from the inner surface of the tapered drum 34 by water discharged from the water rinse spray nozzle 46. The water and DAG particles flow downward through water/air drain apertures 64a–64d disposed in a spaced manner about the lower sprayer inner housing 170 and within the lower sprayer outer housing 54. Various service feedthroughs 76 (shown in dotted line form in FIG. 8) extend upward through the lower sump portion of the CRT funnel internal coating apparatus 20 and allow for deliver of water, air and DAG to upper portions of the coating apparatus. As shown in FIG. 7, air break tubing 94 as well as DAG supply tubing 116 extend upward adjacent to and outside of the cylindrical splash guard 126. The DAG supply tubing 116 extends to a T-block 96 in the neck DAG supply from which a pair of DAG tubes extend for coupling to the DAG slinger disc 42 through the cone housing 82. Air break tubing 94 provides air to the air turbine 86 for terminating rotational displacement of the DAG slinger disc 42. Appropriate tubing within the cone housing 82 couples the DAG slinger disc 42 to the DAG supply tubing 116 as well as to the air break tubing 94, although this tubing and through-housing connections are not shown for simplicity.

An air hose 44 as well as a water tube 112 are also disposed adjacent to and outside of the cylindrical splash guard 126. The air hose 44 extends through the air turbine housing 40 and into the air turbine 86 for rotationally displacing the DAG slinger disc 42. The water tube 112 extends upward through the aperture 34a in a lower portion of the tapered drum 34 and provides water to the drum water rinse spray nozzle 46 shown in FIG. 1. The air break tubing 94 and the DAG supply tube 116 are coupled to and supported by a support post 104 via a coupling bracket 102. Similarly, air hose 44 and water tube 112 are coupled to and supported by support post 108 via coupling bracket 106. A collar clamp 98 couples the DAG slinger disc assembly 38 to an air turbine shaft 91, while a plurality of bolts 90a, 90b and 90c provide secure attachment of the air turbine slinger assembly to the air turbine housing 40.

Figure 2:
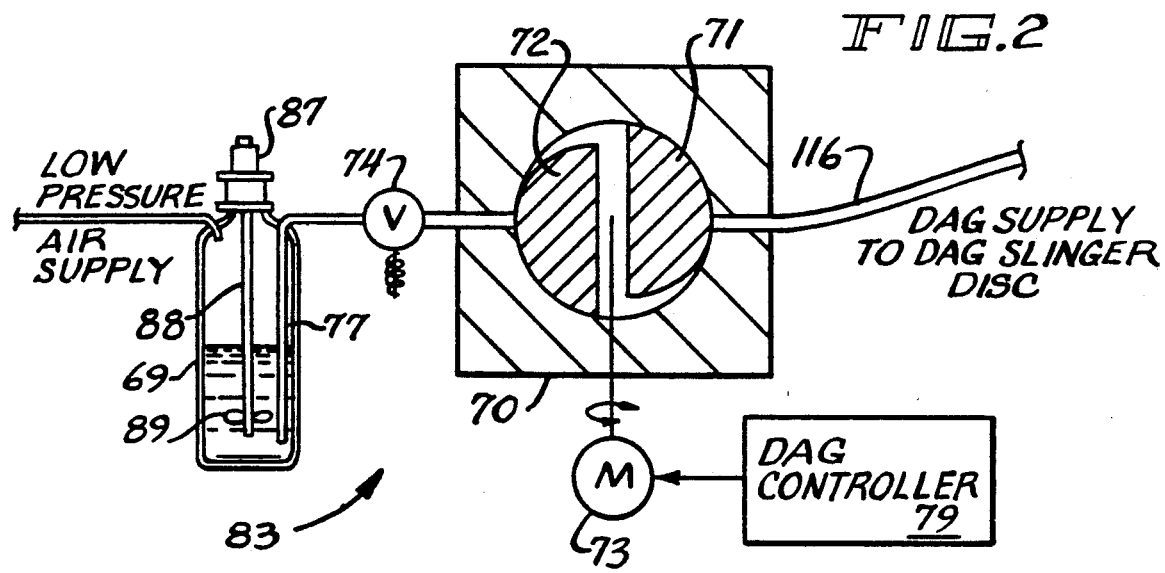
FIG. 2 is a simplified schematic diagram of a DAG supply arrangement for use in the CRT funnel internal coating apparatus of FIG. 1.

Referring to FIG. 2, there is shown a DAG supply 83 for use in the CRT funnel internal coating apparatus of the present invention. Previously described DAG supply 81 is coupled to the stationary, airless spray gun 36, while the DAG supply 83 of FIG. 2 is coupled to the DAG slinger disc 42. The DAG supply 83 includes a neck DAG supply tank 69 which is coupled to a low pressure air supply (not shown for simplicity). The low pressure air supply provides a low pressure air to the supply tank 69 in which is positioned and from which extends a DAG discharge tube 77. The air under low pressure forces a DAG solution up through the discharge tube 77 and out of the neck DAG supply tank 69. Also positioned within the neck DAG supply tank 69 and coupled to a drive motor 87 via a shaft 88 is a propeller 89 for stirring the DAG solution.

DAG discharge tube 77 is coupled via a solenoid control valve 74 to a variable flow valve body 70. Variable flow valve body 70 includes a variable flow valve core 71 within which is disposed a graded variable vane 72. The graded variable vane 72 is capable of rotational displacement within the valve core 71 and is coupled to a drive motor 73. The drive motor 73 is, in turn, coupled to and controlled by a DAG controller 79. Appropriate control inputs from the DAG controller 79 to the drive motor 73 rotationally displaces the graded variable vane 72 in controlling the flow of DAG through the variable flow valve body 70. In order to maintain a DAG coating of constant thickness as the slinger disc 42 is displaced downward through the CRT funnel neck and into the flared portion of the funnel, the amount of DAG discharged by the slinger disc must be increased because of the increase in covered surface area. This is done by appropriate positioning of the graded variable vane 72 under the control of the DAG controller 79. The DAG solution flows through the variable flow valve body 70 and to the air turbine slinger assembly 38 via the DAG supply tube 116.

Figure 10:
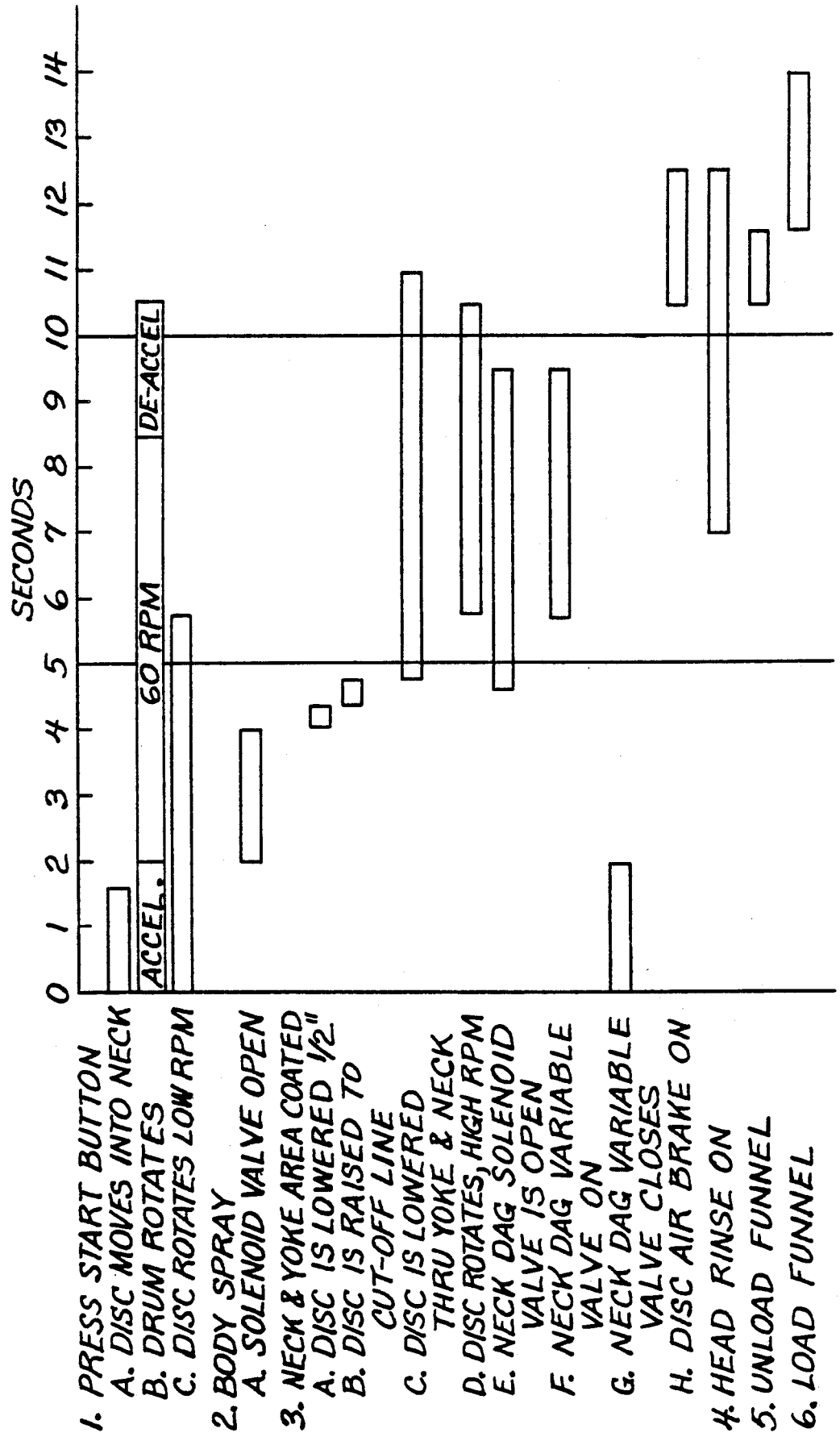
FIG. 10 is a simplified timing diagram in graphic form of the operations carried out by the CRT funnel internal coating apparatus of the present invention.

Referring to FIG. 10, there is shown in graphic form the timed operation of the CRT funnel internal coating apparatus. Operation of the apparatus is initiated by selection of a start button 33 shown at FIG. 4. The apparatus further includes an emergency stop button 35 for removing power from the apparatus and immediately terminating its operation. Following selection of the start button 33, several operations are initiated simultaneously. For example, the slinger disc 42 is moved into the CRT funnel neck, the tapered drum 34 with a CRT funnel 50 disposed thereon begins rotating, and the slinger disc 42 begins rotating at low RPM. A body spray solenoid valve is then opened permitting the stationary, airless spray gun 36 to direct DAG onto the flared portion of the inner surface of the CRT funnel 50 designated by the letter "X" in FIG. 11. This DAG coating covers and makes electrical contact with an anode button 186 extending through the CRT funnel 50. With the body of the CRT funnel 50 thus covered with a DAG layer by the airless stationary DAG spray gun 36, the slinger disc 42 is lowered one-half inch from its initial position within the CRT funnel neck and is then raised to the cut-off line shown in FIG. 11. As the rotational displacement of the tapered drum 34 continues, the slinger disc 42 is then moved downward through the CRT funnel neck over the distance designated "Y" as it is rotationally displaced at high RPM. The neck DAG solenoid valve 74 is then opened and the neck DAG variable valve controller 79 adjusts the position of the graded variable vane 72 in the variable flow valve core 71 to provide a neck DAG coating of uniform thickness. The DAG controller 79 then closes the neck DAG valve 74 and air is applied to the disc air break to terminate rotation of the slinger disc 42. Water is then discharged from the drum water rinse spray nozzle 46 onto the inner surface of the tapered drum 34 to remove DAG not deposited on the inner surface of the CRT funnel 50. The CRT funnel 50 is then removed either manually or by automated equipment from the platform 24 on the upper portion of the tapered drum 34. Another CRT funnel is then positioned on the CRT funnel internal coating apparatus and the cycle is re-initiated. The entire cycle occurs over a period of approximately 15 seconds.

There has thus been shown a CRT funnel internal coating apparatus and method which employs a fixed DAG spray gun for applying a first DAG layer to a flared, inner surface of a CRT funnel as the funnel is rotationally displaced. Also employed is a rotating DAG slinger disc which is inserted into the neck portion of the CRT funnel and moved toward its open front end as a second DAG layer is deposited on the inner neck portion of the CRT funnel so as to overlap the first DAG layer. The DAG coating operation is entirely automatic; avoids environmental contamination by confining and recovering DAG not deposited on the CRT funnel; and is particularly adapted for the high speed processing of large numbers of CRT funnels.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based o the prior art.

I claim:

1. Apparatus for depositing an electrically conductive DAG coating on an inner surface of a CRT funnel having a narrow neck portion, an enlarged open end and a flared portion therebetween, said apparatus comprising:

platform means for receiving and supporting the CRT funnel, said platform means including an aperture disposed adjacent to the enlarged open end of the CRT funnel;

first stationary DAG discharge means for directing the DAG upward through the aperture in said platform means; 10 rotational drive means coupled to said platform means for rotating said platform means and a CRT funnel positioned thereon as said first stationary discharge means directs DAG upward through the aperture in said platform means in depositing a first DAG coating on the flared portion of the CRT funnel;

second rotating DAG discharge means for directing DAG radially outward; and displacement means coupled to said second rotating DAG discharge means for positioning said second discharge means in the neck of the CRT funnel and displacing said second discharge means toward the enlarged open end of the CRT funnel in depositing a second DAG coating on the neck portion of the CRT funnel.

2. The apparatus of claim 1 further comprising guide means disposed on said platform means for ensuring closely spaced positioning of the CRT funnel relative to the aperture in said platform means.

3. The apparatus of claim 2 wherein said guide means includes a plurality of combination guide posts and stops for guiding and engaging the enlarged open end of the CRT funnel.

4. The apparatus of claim 3 wherein said guide means further includes a plurality of fixed rollers and a plurality of movable rollers for engaging and guiding the CRT funnel.

5. The apparatus of claim 4 wherein said movable rollers are spring-loaded for urging the enlarged open end of the CRT funnel in tight fitting engagement with each of said fixed rollers.

6. The apparatus of claim 1 wherein said second rotating DAG discharge means includes a rotating disc.

7. The apparatus of claim 6 wherein said second rotating DAG discharge means further includes air turbine means for rotationally displacing said disc.

8. The apparatus of claim 1 further comprising means for confining and recovering DAG not deposited on the CRT funnel during CRT funnel coating.

9. The apparatus of claim 1 wherein said displacement means includes a threaded screw arrangement for converting rotational displacement to linear displacement of the second rotating DAG discharge means.

10. The apparatus of claim 9 wherein said displacement means includes a rotary drive motor coupled to a ball screw engaging a ball screw nut, and wherein said second rotating DAG discharge means is coupled to said ball screw nut.

11. A method of coating an inner surface of a CRT funnel with a conductive layer of DAG, said CRT funnel including a narrow neck portion, an enlarged open end and a flared portion therebetween, said method comprising the steps of:

positioning a CRT funnel on a support platform having an aperture therein;

rotationally displacing the support platform and CRT funnel;

directing DAG from a stationary DAG discharge means onto the CRT funnel, thereby forming a first DAG layer on the CRT funnel;

directing DAG radially outward from a DAG discharge arrangement onto the inner neck portion of the CRT funnel; and displacing the DAG discharge arrangement within the neck portion of the CRT funnel toward the enlarged open end of the funnel, thereby forming a second DAG layer on the CRT funnel neck.

12. The method of claim 11 further comprising the steps of removing and recovering DAG not deposited on the CRT funnel.

13. The method of claim 11 further comprising the step of varying the amount of DAG deposited on the CRT funnel as the DAG discharge arrangement is displaced to provide a DAG layer of constant thickness in compensating for the flared shape of the CRT funnel.

14. The method of claim 11 further comprising the step of directing an air flow down through the CRT funnel from the neck portion and upward about the periphery of the enlarged open end of the CRT funnel to prevent escape of DAG from the CRT funnel.

15. The method of claim 11 further comprising the step of forming the second DAG layer in an overlapping manner with the first DAG layer.

16. The method of claim 11 further comprising the step of rotationally displacing the support platform continuously during formation of the first and second DAG layers.

17. The method of claim 11 further comprising the steps of rotationally displacing the DAG discharge arrangement at a first rotational velocity followed by a second rotational velocity during formation of said second DAG layer.

18. The method of claim 17 wherein said first rotational velocity is less than said second rotational velocity.

* * * * *